(No Model.)

DU BOIS F. GERALDS.
REFRIGERATOR HOUSE.

No. 333,407. Patented Dec. 29, 1885.

WITNESSES
B. C. Fenwick
G. S. Cooper

INVENTOR
Dubois F. Geralds,

H. F. Ennis, Attorney.

UNITED STATES PATENT OFFICE.

DU BOIS F. GERALDS, OF CLINTONDALE, NEW YORK.

REFRIGERATOR-HOUSE.

SPECIFICATION forming part of Letters Patent No. 333,407, dated December 29, 1885.

Application filed September 23, 1885. Serial No. 177,954. (No model.)

*To all whom it may concern:*

Be it known that I, DU BOIS F. GERALDS, a citizen of the United States, residing at Clintondale, in the county of Ulster and State of New York, have invented certain new and useful Improvements in Refrigerator-Houses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to refrigerator-houses; and the object is to provide a storehouse for preserving perishables—such as fruit and vegetables—during a glut of the market, or between the time of harvesting and that of transportation; and to these ends the novelty consists in the construction, combination, and arrangement of the same, as will be hereinafter more fully described, and particularly pointed out in the claim.

In the accompanying drawings the same letters of reference indicate like parts of the invention.

Figure 1:
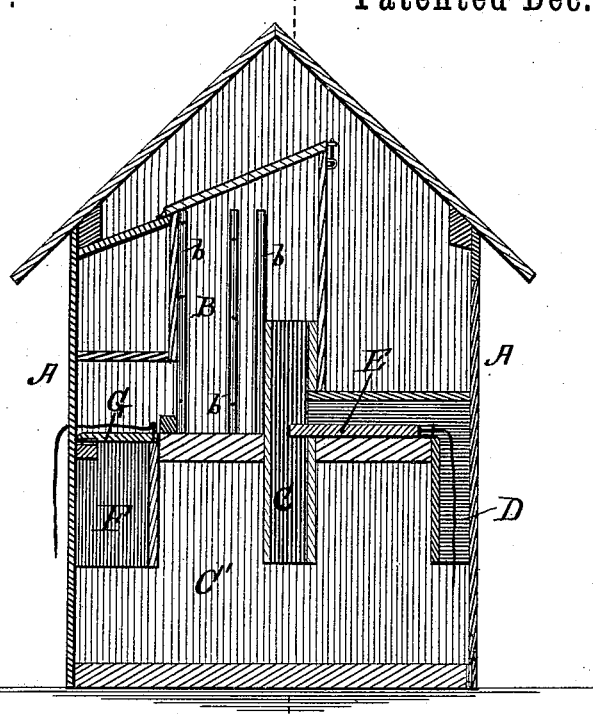
Figure 2:
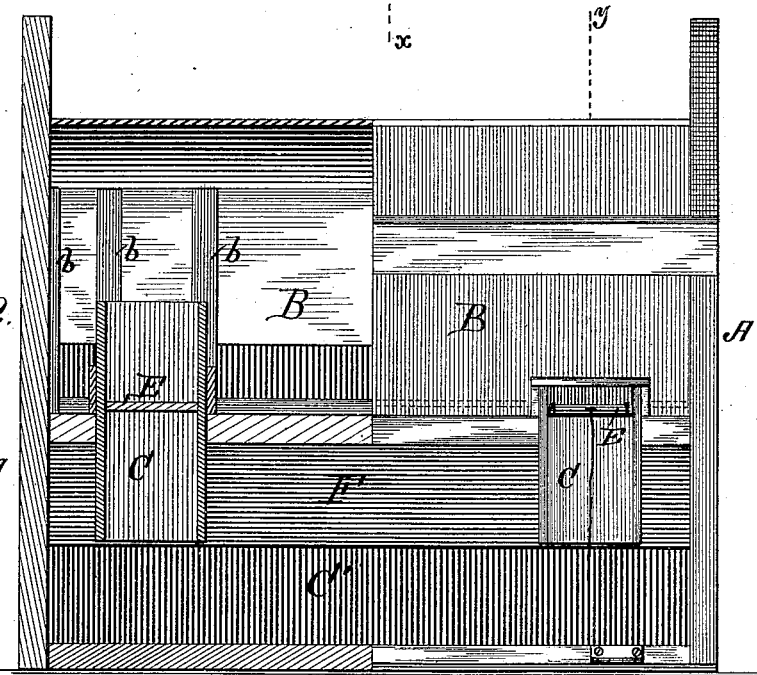

Figure 1 is a vertical cross-section on the line $y$ $y$ of Fig. 2, and Fig. 2 is a partial elevation and a partial section with the front removed, and the section portion taken on the line $x$ $x$ of Fig. 1, and looking toward the rear.

A A is the frame of the house. B is the ice-chamber, and C' the refrigerator-chamber. The ice is packed in the chamber B, and $b$ $b$ are guards to protect the ice and prevent it from falling through the cold-air ducts or coming in contact with the sides of the frame.

C C are the downward cold-air ducts, and D the up or warm-air ducts, both being provided with suitable slide-valves or cut-offs, E. The cold air, in descending the ducts C C, is met by the warmer air arising from the chamber C', reducing it to the same temperature as the upward current, and a uniform downward current is thus established, and the slide-valve E may then be regulated so that the cold air may continue its downward course and the warmer air ascend through the ducts D, where it mixes with the cold air, and is again returned to the lower chamber.

F is an auxiliary cold-air duct, the opening of which is regulated by the valve G, so that a greater supply of cold air may be admitted to the lower chamber when necessary.

The fruit, in suitable packages, is stored in the lower or refrigerator chamber, C', and preserved for an indefinite time by the action of the cold air falling through the ducts C, while the warm air consequent upon the latent heat in the fruit ascends through the ducts D, where it is met, as above stated, and thoroughly mixed, so as to be reduced to the same temperature as the downward current from the ice-chamber B, the result of which is, that a uniform low temperature is maintained in the chamber C', and that without the destructive sweating action on the fruit, as is often the case where the cold air is mixed with the warm air in the lower chamber, as the sweating due to the meeting of the currents of different temperatures is almost entirely overcome by mixing the conflicting currents in the ducts, and if any does occur it takes place in said ducts, where no harm is done, as the condensation does not come in contact with the fruit, which is in the lower chamber.

Having thus fully described my invention, what I claim as new and useful, and desire to secure by Letters Patent of the United States, is—

The combination, in a refrigerator-house having an upper ice and a lower refrigerator chamber, of the downward cold-air ducts C C and the intersecting warm-air ducts D, provided with the common valve E, as and for the purpose set forth.

In testimony whereof I affix my signature in presence of two witnesses.

DU BOIS F. GERALDS.

Witnesses:
WEBSTER D. BOND,
GEORGE F. WELKER.